United States Patent
Yang et al.

(10) Patent No.: US 7,421,615 B2
(45) Date of Patent: Sep. 2, 2008

(54) APPARATUS, METHOD AND SYSTEM FOR SELECTIVELY COUPLING A LAN CONTROLLER TO A PLATFORM MANAGEMENT CONTROLLER

(75) Inventors: Yinglin Yang, Plano, TX (US); Jinsaku Masuyama, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 576 days.

(21) Appl. No.: 10/951,126

(22) Filed: Sep. 27, 2004

(65) Prior Publication Data

US 2006/0028993 A1  Feb. 9, 2006

Related U.S. Application Data

(60) Provisional application No. 60/599,503, filed on Aug. 6, 2004.

(51) Int. Cl.
*G06F 11/00* (2006.01)
(52) U.S. Cl. ............... 714/11; 714/12; 714/13; 714/55
(58) Field of Classification Search .......... 714/11, 714/55
See application file for complete search history.

(56) References Cited

U.S. PATENT DOCUMENTS

| | | | |
|---|---|---|---|
| 6,314,525 B1 * | 11/2001 | Mahalingham et al. ........ 714/4 |
| 6,370,155 B1 * | 4/2002 | Cantwell et al. ............ 370/465 |
| 6,587,970 B1 | 7/2003 | Wang et al. .................. 714/47 |
| 6,718,383 B1 | 4/2004 | Hebert ...................... 709/224 |
| 6,728,780 B1 | 4/2004 | Hebert ...................... 709/239 |
| 6,763,479 B1 | 7/2004 | Hebert .......................... 714/4 |
| 6,874,147 B1 * | 3/2005 | Diamant ..................... 719/328 |
| 2005/0081084 A1 * | 4/2005 | Lai et al. ....................... 714/4 |
| 2005/0091360 A1 * | 4/2005 | Chen et al. .................. 709/223 |
| 2005/0228888 A1 * | 10/2005 | Mihm et al. ................ 709/227 |
| 2006/0018263 A1 * | 1/2006 | McGee et al. ............... 370/241 |
| 2006/0028993 A1 * | 2/2006 | Yang et al. .................. 370/250 |

OTHER PUBLICATIONS

*Comparing the I2C Bus to the SMBus*, Maxim, Miscellaneous Circuts, Application Note 356, 4 pgs; web page address www.maxim-ic.com/an356, Dec. 1, 2000.

Phillips Semiconductors, *The I²C-bus and How to use it (including specifications)*, pp. 3-3 to 3-26, Apr. 1995.

* cited by examiner

*Primary Examiner*—Emerson C Puente
(74) *Attorney, Agent, or Firm*—Baker Botts L.L.P.

(57) ABSTRACT

Remote access to a platform management system, for example via an intelligent platform management interface (IPMI), is maintained despite a failure affecting a local area network (LAN) controller. Failover to a second, operational LAN controller can be achieved by monitoring the status of the LAN controllers, and using a selector to couple a different LAN controller to a platform controller if the LAN controller currently coupled to the platform controller fails.

20 Claims, 2 Drawing Sheets

APPARATUS, METHOD AND SYSTEM FOR SELECTIVELY COUPLING A LAN CONTROLLER TO A PLATFORM MANAGEMENT CONTROLLER

REFERENCE TO PRIOR APPLICATIONS

This application claims the benefit of U.S. Provisional Application No. 60/599,503, filed Aug. 6, 2004.

TECHNICAL FIELD

This disclosure relates generally to remote access platform management, and more particularly to selectively coupling network controllers to platform management controllers.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems may include embedded systems management software or firmware that can be used to notify users about potential hardware problems. Such information handling systems often communicate alerts associated with detected hardware problems over a network connection to a remote monitoring location.

In typical embedded systems management implementations, the information associated with detected hardware problems is communicated over a separate sideband path from the primary data flow path. In some such implementations, the subsystem responsible for systems management is coupled directly to a single network controller over a system management bus (SMBus), or a multi-master bus such as an inter-integrated circuit (I²C) bus. Such systems are susceptible to failures in the network controller, and to failures elsewhere on the network to which the network controller is connected. That is to say, if a network failure renders the network controller to which the embedded management system is connected inoperative, remote management of the server is not rerouted through another network controller, even if the primary data path is rerouted to another controller.

SUMMARY

In accordance with teachings of the present disclosure, a system and method are described for allowing continued remote management of a platform, such as an information handling system, even if a network controller over which remote management signals are transmitted fails.

In at least one embodiment, an apparatus, including multiple local area network controllers is provided. The apparatus also includes a selector that is coupled to the LAN controllers. The selector is configured to selectively connect one of the LAN controllers to a platform management controller based on an operational status of the LAN controllers.

Other embodiments include a method capable of providing remote management failover that includes monitoring an operational status of multiple local area network controllers. The method further includes selectively coupling one of the LAN controllers to a platform management controller based on the status of the network controllers. In some such embodiments, a programmable logic device receives signals indicating the operational status of respective LAN controllers. The programmable logic device uses these signals to generate a control signal, which is in turn provided to a multiplexer. The multiplexer is controlled by the control signal to couple an operational LAN controller to the platform management controller.

A system capable of implementing remote access failover, according to at least one embodiment, includes a baseboard management controller, multiple local area network (LAN) controllers, and a multiplexer configured to selectively couple one of the LAN controllers to the baseboard management controller based on an operational status of the LAN controllers.

Various embodiments described herein, are capable of implementing teaming across LAN controllers included in separate semi-conductor packages, such that failure of one such LAN controller does not substantially impede remote access management of a platform.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
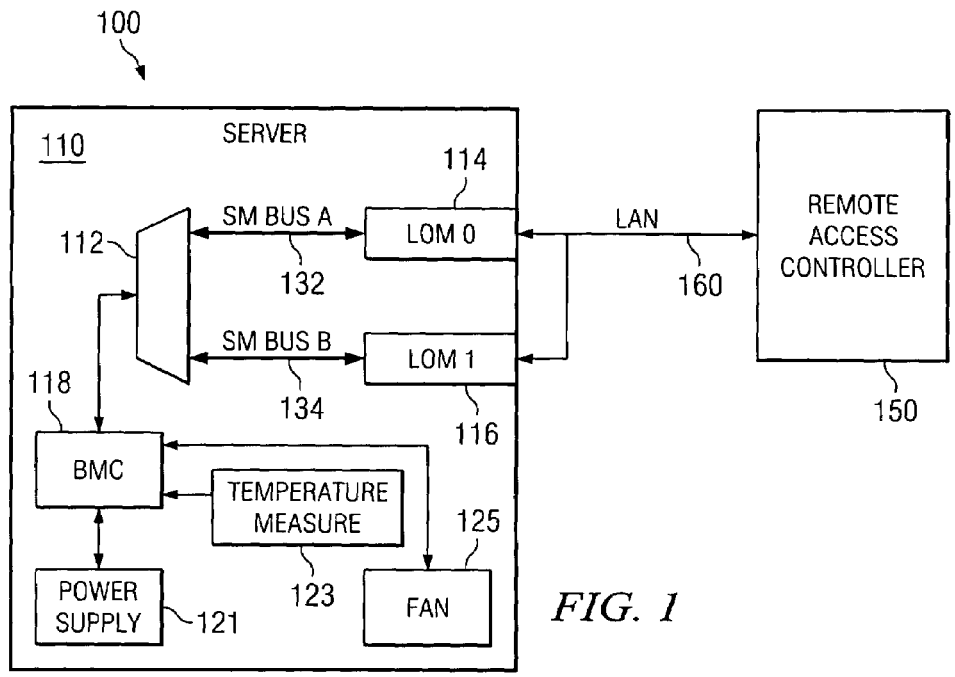
FIG. 1 is a block diagram of a system providing LAN failover for remote access control of a platform according to an embodiment of the present disclosure.
Figure 3:
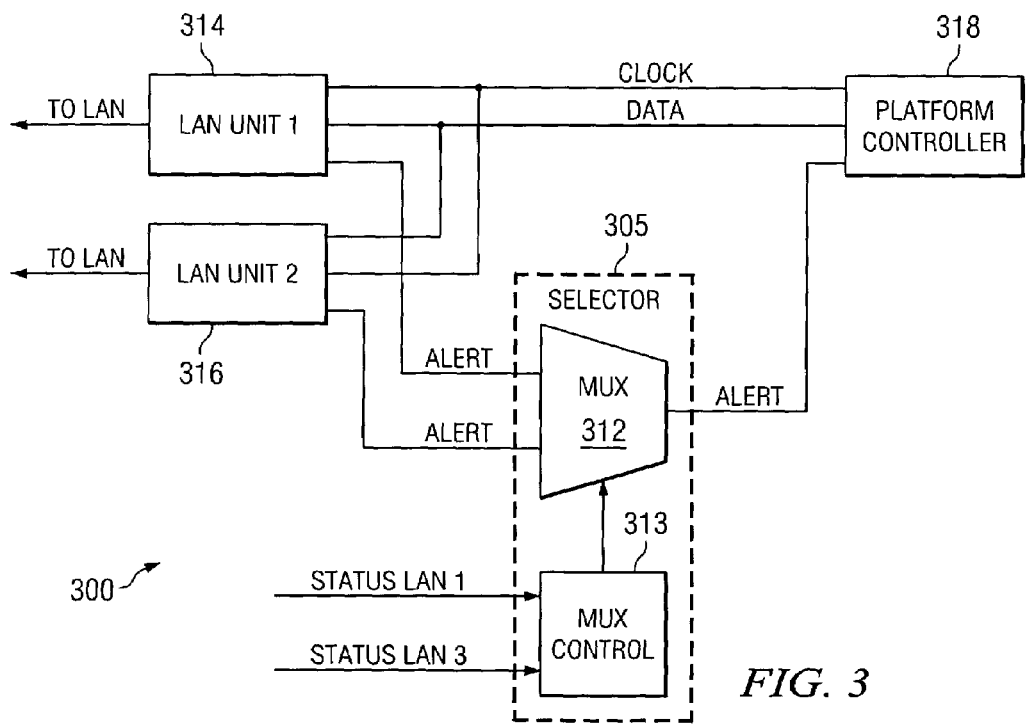
FIG. 3 is a block diagram illustrating a selector used to selectively connect an alert signal between a LAN unit and a platform controller according to an embodiment of the present disclosure.
Figure 2:
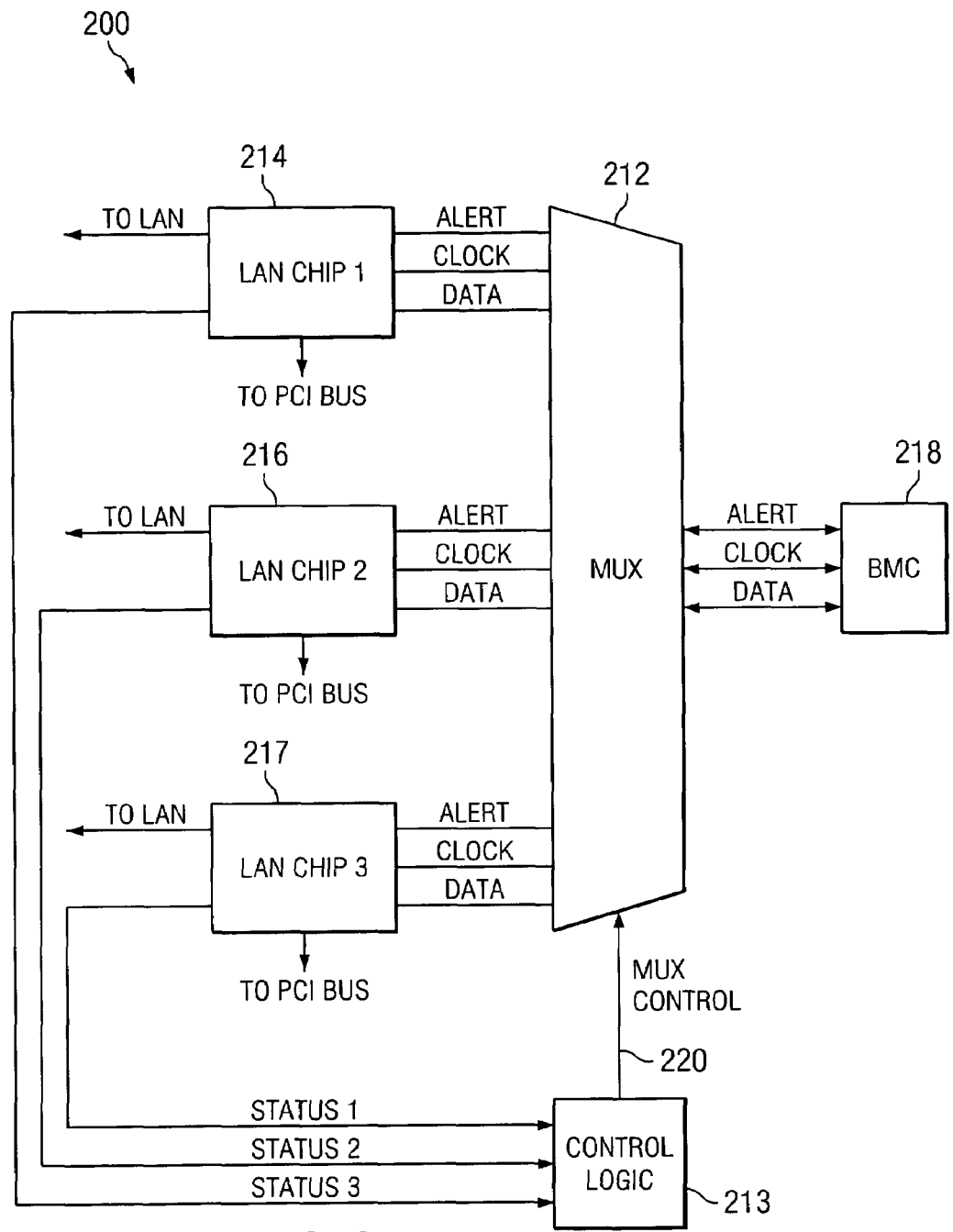
FIG. 2 is a block diagram illustrating the use of a multiplexer to connect an SMBus between a LAN chip and a baseboard management controller according to an embodiment of the present disclosure.

Preferred embodiments and their advantages are best understood by reference to FIGS. 1 through 3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 illustrates a system 100 according to an embodiment of the present disclosure. System 100 includes server 110 communicatively coupled to remote access controller 150 over local area network (LAN) 160. Server 110 is, in one embodiment, an information handling system that includes such standard elements as a processor, memory, volatile and non-volatile storage, etc., (not illustrated for clarity of illustration).

Server 110 also includes two (2) LAN controllers, LAN on Motherboard Zero (LOM0) 114 and LAN on Motherboard One (LOM1) 116. LOM0 114 and LOM1 116 are connected to multiplexer 112 via SMBusA 132 and SMBusB 134, respectively. Multiplexer 112 selects LOM0 114 or LOM1 116 to be coupled to baseboard management controller (BMC) 118 based on the operational status of the LAN controllers, such that an operational LAN controller is connected to BMC 118, if an operational controller is available.

BMC 118 interfaces with various monitoring and other physical systems of server 110, for example power supply 121, temperature measurement system 123 and fan 125. BMC 118 may issue commands to the various systems, or receive status indications from those or other systems, to implement monitoring and control of various platform systems on server 110. For example, BMC 118 may receive a command from a processor (not illustrated) located on server 110 to increase the speed of fan 125. Upon receipt of that command, BMC 118 will send an appropriate control signal to adjust the speed of fan 125, as requested.

In at least one embodiment, BMC 118 is part of an intelligent platform management interface (IPMI), which can be controlled from remote access controller (RAC) 150 via LAN 160. In such an embodiment, remote access controller 150 provides control signals to BMC 118 to effectuate control of various systems on server 110. For example, BMC 118 may receive a command from RAC 150 to decrease the voltage supplied by power supply 121. Such a situation may arise, for example, if RAC 150, while monitoring various status signals provided by BMC 118, determines that the voltage being supplied by power supply 121 exceeds a desired level.

In the case where RAC 150 is monitoring or controlling one or more platform systems on server 110, status and command information for such control can be provided to BMC 118 over LAN 160 through either LOM0 114 or LOM1 116. In at least one embodiment, LOM0 114 is the default controller used to connect RAC 150 to BMC 118. Multiplexer 112 is controlled to select SMBusA 132 between LOM0 114 and BMC 118. In the event of a failure of either LOM0 114 or the portion of LAN 160 used to connect RAC 150 to LOM0 114, multiplexer 112 can connect another controller to BMC 118.

In the illustrated embodiment, LOM1 116 is connected to BMC 118, and LOM0 114 is disconnected from BMC 118. In this way, failover of remote access control may be achieved. It should be noted that failover capabilities provided by various embodiments can be provided for various LAN configurations, including teaming of LOM0 114 and LOM1 116, use of multiple LANs, and various other load sharing arrangements may be implemented using LOM0 114 and LOM1 116.

Referring next to FIG. 2, an apparatus 200 including a multiplexer (MUX) 212, which couples an SMBus, an $I^2C$ Bus, or some similar bus between a selected LAN chip and a controller such as BMC 218, is illustrated according to an embodiment of the present disclosure. In the illustrated embodiment, BMC 218 can provide alert signals through mucks 212 to one of three local area networks (LAN) by using control logic 213. Control logic 213 controls MUX 212 to couple a desired LAN chip 214, 216, or 217 to BMC 218. In the illustrated embodiment, each LAN chip 214, 216 and 217 is connected to both a LAN and a peripheral component interconnect (PCI) Bus.

Each LAN chip 214, 216, and 217 is, in at last one embodiment, a LAN controller implemented in a stand alone semiconductor package. Each of these semi-conductor packages can be connected to a circuit board (not illustrated), which is in turn connected to a common PCI bus. LAN chip 214 receives information from its associated LAN, and provides some of this information to an associated information handling system over the PCI bus. Other information, e.g. information associated with embedded systems management (ESM) applications, are routed through MUX 212 to BMC 218. The ESM data includes, but is not necessarily limited to, an alert signal, a clock signal, and control data.

In at least one embodiment, LAN chip 214, LAN chip 216 and LAN chip 217 are each connected to a common local area network. In other embodiments, each of the LAN chips 214, 216 and 217 are connected to separate local area networks, or are connected in a teaming fashion, such that the communications load is shared between the LAN chips. In any event, in the illustrated embodiment, ESM related data alerts, and clock signals are connected between the local area network and BMC 218 through a single LAN chip.

Assume, for purposes of the following example, that LAN chip 214 is the primary LAN chip used to provide ESM associated information between a remote controller (not illustrated) and BMC 218. If LAN chip 214 fails, the ESM associated data is routed to BMC 218 through one of the other LAN chips 216 or 217. To accomplish this re-routing, control logic 213 monitors the status of LAN chip 214, LAN chip 216 and LAN chip 217 and their respective associated local area networks. Upon recognizing a failure associated with LAN chip 214, control logic 213 provides a signal over MUX control line 220 to cause multiplexer 212 to select either LAN chip 216 or LAN chip 217 as the new primary conduit for ESM associated data.

It will be appreciated that control logic 213 can use status signals from LAN chips 214, 216 and 217 alone or in addition to other signals (not illustrated) to determine whether to change the multiplexer control signal delivered to multiplexer 212.

Control logic 213 may implemented as a programmable logic device, such as a plainer complex programmable logic device (CPLD), as a program of instructions to be executed by a processor, as firmware, or in various other ways which will become apparent to those skilled in the art upon consideration of the present disclosure.

Referring next to FIG. 3, an apparatus 300 employing selector 305 to selectively connect platform controller 318 with a selected LAN unit 314 or 316, will be discussed according to an embodiment of the present disclosure. Note at least one difference between apparatus 300 illustrate in FIG. 3 and apparatus 200 illustrated in FIG. 2: apparatus 200, in at least one embodiment, selectively connects all, or a large portion of, the data lines included in a communications bus, while apparatus 300 selectively connects a single data line used to carry an alert signal between platform controller 318 and a selected LAN unit 314 or 316. Apparatus 300 provides fixed connections for clock and control data signals between platform controller 318 and both LAN units 314 and 316. The alert signal is selectively provided to a single LAN unit 314 or 316 to allow platform controller 318 to assert and/or de-assert an alert signal, as may be required for proper operation of particular implementations of intelligent platform management interfaces.

Selector 305 includes multiplexer (MUX) 312 and MUX controller 313, but may include other equivalent circuitry as deemed appropriate, based on various design and/or operational considerations.

MUX control 313 receives status indications associated with LAN units 314 and 316. It should be appreciated that the status indications may come from a location other than LAN units 314 and 316. For example, if a LAN connected to LAN unit 314 is inoperable, a status signal so indicating may be generated at a remote location, and be provided to MUX control 313 via LAN unit 316. In such a way, an indication that a particular LAN has failed can be provided through a back up, or shared LAN. MUX control 313 may, in some embodiments, control which of the LAN units 314 or 316 is coupled to platform controller 318, and particularly which LAN unit 314 or 316 will receive the alert signal generated by platform controller 318, according to the following truth table.

| LAN 314 STATUS | LAN 316 STATUS | LAN SELECTED |
|---|---|---|
| down | down | 314 |
| up | down | 314 |
| down | up | 316 |
| up | up | previous state |

Thus, if both LAN unit 314 and LAN unit 316 are down, e.g. nonfunctional, LAN unit 314 will be selected to receive any alert signals generated by platform controller 318, even though such alert signals will not be sent over the LAN, because both LAN unit 314 and 316 are in an inoperative state. In the event that LAN 314 is up and LAN 316 is down, LAN 314 will be selected for connection to platform controller 318. If LAN 314 is down and LAN 316 up, then LAN 316 will be selected to receive alert signals generated by platform controller 318. Finally, if both LANs are in an operational state, then the previously selected LAN will remain selected.

For example, on initial power up of a platform, LAN 314 and LAN 316 may both be down, which would cause LAN 314 to be connected to platform controller 318. During the power up sequence, however, both LAN units may become operational, resulting in the previously selected LAN unit remaining connected to platform controller 318. Thus, in the initial power-up situation, LAN unit 314 will be selected as the default control unit for providing ESM associated data to platform controller 318, according to the illustrated embodiment.

By selectively connecting network controllers to a platform controller, as disclosed above in various embodiments, IMPI failover can be provided across network controllers, even if an entire network controller becomes non-operational. Such failover protections can be implemented even if teaming is performed across LAN controllers, and independent of the number ports provided on any one particular LAN controller.

It should be appreciated that the control logic used to control multiplexers in the previously described embodiments, may use existing planar complex programmable logic device (CPLD) chips to provide any decision making logic used to control the multiplexer. Thus, various embodiments of the present disclosure can be implemented in existing systems without requiring an extra programmable logic device. Additionally, failover functionality can be achieved without requiring multiple BMC chips or other platform controllers, and can be implemented using network controllers from various sources. By not requiring additional BMC controllers or programmable logic devices, and because various embodiments of the present disclosure can be implemented independent of the type of LAN controller used, significant cost savings and design flexibility may be achieved.

Although the disclosed embodiments have been described in some detail, it should be understood that various changes, substitutions and alterations can be made to the embodiments without departing from their spirit and scope.

What is claimed is:

1. An apparatus comprising:
    a plurality of local area network (LAN) controllers; and
    a selector coupled to the plurality of LAN controllers, said selector configured to selectively couple one of the plurality of LAN controllers to a platform management controller based, at least in part, on an operational status of one or more of the LAN controllers;
    wherein the selector comprises a multiplexer connected between the platform management controller and each of the plurality of LAN controllers;
    wherein a first type of data signal is communicated between the platform management controller and the selected LAN controller via the multiplexer and not independent of the multiplexer; and
    wherein a second type of data signal is communicated between the platform management controller and the selected LAN controller independent of the multiplexer and not via the multiplexer.

2. The apparatus of claim 1, wherein the selector comprises:
    the multiplexer; and
    combinatorial logic coupled to receive indicator signals indicating a status of respective network controllers, and to provide a control signal in response to the indicator signals.

3. The apparatus of claim 1, wherein at least one of the plurality of LAN controllers comprises a plurality of communication ports.

4. The apparatus of claim 1, wherein the platform management controller comprises a baseboard management controller (BMC).

5. The apparatus of claim 4, wherein the BMC is part of an Intelligent Platform Management Interface (IPMI).

6. The apparatus of claim 1, wherein each of the plurality of LAN controllers comprises a separate semiconductor package.

7. The apparatus of claim 1, further comprising the plurality of LAN controllers configured to implement teaming.

8. A method comprising:
    monitoring an operational status of a plurality of local area network (LAN) controllers;
    coupling a selected LAN controller of the plurality of LAN controllers to a platform management controller based, at least in part, on the monitored operational status of the LAN controllers;
    coupling a first type of data signal between the platform management controller and the selected LAN controller via a multiplexer connected between the platform management controller and the selected LAN controller, and not independent of the multiplexer; and coupling a second type of data signal between the platform management controller and the selected LAN controller independent of the multiplexer and not via the multiplexer.

9. The method of claim 8, wherein the coupling comprises:

receiving a plurality of indicator signals indicating the operational status of respective LAN controllers at a programmable logic device (PLD);

generating a control signal at the PLD based, at least in part, on the indicator signals; and using the control signal to control the multiplexer to couple the selected LAN controller to the platform management controller.

10. The method of claim 8, wherein the first signal is an alert signal.

11. The method of claim 8, further comprising using a baseboard management controller (BMC) as the platform management controller.

12. The method of claim 11, further comprising providing, to the BMC, signals associated with an Intelligent Platform Management Interface (IPMI).

13. The method of claim 8, further comprising teaming the plurality of LAN controllers.

14. A system comprising:

a platform management controller;

a plurality of local area network (LAN) controllers; and a multiplexer configured to selectively couple a selected LAN controller of the plurality of LAN controllers to the platform management controller based, at least in part, on an operational status of one or more of the LAN controllers;

wherein a first type of data signal is communicated between the platform management controller and the selected LAN controller via the multiplexer and not independent of the multiplexer; and wherein a second type of data signal is communicated between the platform management controller and the selected LAN controller independent of the multiplexer and not via the multiplexer.

15. The system of claim 14, further comprising a a programmable logic device (PLD) to receive respective indicator signals indicating a status of respective network controllers, and to provide a control signal based, at least in part, on the indicator signals.

16. The system of claim 14, wherein at least one of the plurality of LAN controllers comprises a plurality of communication ports.

17. The system of claim 14, wherein:

the second signal is a clock signal; and the first signal is an alert signal generated by the platform management controller.

18. The system of claim 14, wherein:

the first signal is an alert signal generated by the platform management controller; and the second signal is a data signal.

19. The system of claim 14, further comprising each of the plurality of LAN controllers in a separate semiconductor package.

20. The system of claim 14, further comprising the plurality of LAN controllers configured to implement teaming.

* * * * *